United States Patent Office 3,275,632
Patented Sept. 27, 1966

3,275,632
MELAMINE PRODUCTION IMPROVEMENT
Ernst Doehlemann, Tacherting, Franz Kaess, Traunstein, Leo Reitter, Neuschalchen, and Kurt Scheinost, Tacherting, Germany, assignors to Süddeutsche Kalkstickstoff-Werke Aktiengesellschaft, Trostberg, Germany
No Drawing. Filed July 19, 1963, Ser. No. 296,389
Claims priority, application Germany, July 20, 1962, S 80,520
5 Claims. (Cl. 260—249.7)

This invention relates to the continuous preparation of melamine from urea.

It is known to obtain melamine in good yields by heating urea or its pyrolysis products together with a silica gel of large inner surface as catalyst in the presence of ammonia at 220 to 400° C.; thereby, the catalyst is placed by means of the ammonia into turbulent motion, and the starting material is introduced into the turbulent zone. The formed melamine leaves the turbulent zone, i.e. the catalyst, together with ammonia. A principal drawback of this process is the movement of the entire catalyst as a fluidized bed, which produces attrition of the catalyst and requires continuous replacement of considerable amounts of the catalyst. A further drawback is the short residence time of the starting and intermediate products at the catalyst; part of said products leaves the fluidized bed in the unreacted state which reduces the melamine yield and requires complex separating operations during the condensation of the melamine or with the condensed sublimate.

According to a modification of said process, only the first reaction step, the endothermic conversion of urea to cyanamide, is carried out in a fluidized bed of the catalyst while the following exothermic reaction step, the conversion of cyanamide to melamine, is carried out in a stationary catalyst bed. The cyanamide-melamine vapor mixture obtained in the fluidized bed is passed together with the ammonia, which serves as carrier gas for the fluidized bed, into said stationary bed. The melamine formed in the stationary catalyst bed is sublimied off the catalyst into the carrier gas and is recovered by condensation at a suitable low temperature.

Though the described modification has certain advantages over the basic process, it has still considerable drawbacks. Particularly, it still uses the catalysts as a fluidized bed, and those catalysts which are suitable for the melamine synthesis have so little resistance to abrasion that they are pulverized within a very short time. This results in a large consumption of catalyst and requires removal of the pulverized catalyst from the gas current before it enters the stationary catalyst bed because otherwise clogging would be unavoidable. The silica gels, which are most favorable from the point of view of abrasive strength, have the undesirable property of splitting when absorbing molten urea, which again causes fast wear of the catalyst material.

A further disadvantage of the known methods is the following: When urea is fed into a fluidized catalyst bed of silica having a large inner surface, only a part of the urea is converted within a short time to cyanamide which vaporizes; the balance of the urea is converted inside the catalyst to melamine which is quite strongly absorbed and only slowly released. If in a continuous operation, a fluidized bed is strongly impinged by urea, it may occur that, in the unit of time, more melamine is formed at the catalyst than sublimed off; in other words, the catalyst material of the fluidized bed is slowly completely saturated with melamine. As a result, the evaporation of urea in the direction of cyanamide formation is no longer possible, and due to the decomposition of urea and other difficultly vaporizable intermediary products, crusts are formed which render the fluidized bed inefficient within a very short time.

In addition to said difficulties, the series connection of two catalysts layers which are operated under different conditions introduces a further drawback. As the consequence of oscillations of the catalytic efficiency of the fluidized bed, which, due to the short residence time of the reaction medium, is very sensitive to all changes of the operative conditions, the demands on the stationary catalyst bed are also subject to considerable fluctuations, which makes it difficult to maintain a constant temperature in said stationary bed.

Finally, the catalysts of the fluidized bed which, though they have little abrasive strength, are quite hard, cause strong erosion and shorten the life of the apparatus.

We have found that optimum yields are obtained with a low consumption of catalyst when in a process using sequentially a fluidized and a stationary bed, a fluidized bed of inert material is used to produce at a temperature of at least 250° C. ammonium cyanate vapor which is then contacted in the stationary bed at 260 to 450° C. with a catalyst containing phosphate, borate, arsenate, or sulfate. According to the equation

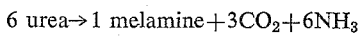

6 urea → 1 melamine + $3CO_2$ + $6NH_3$ melamine is obtained in a yield up to 96%.

The urea is vaporized by means of ammonia at temperatures above 250° C. in a fluidized bed which consists of a non-adsorbent and non-porous inert material which is resistant to abrasion and to chemical attack by urea and ammonium cyanate or cyanuric acid. The urea is introduced into said bed as described, for instance, in Patent No. 2,712,491. A particularly suitable inert material are copper granules which are soft and do not erode the material of the apparatus, which is also copper.

The essential difference of the use of an inert material, as compared with a catalyst, in the fluidized bed is that, in the former case, urea is only subjected to a rearrangement to ammonium cyanate, which vaporizes, while, in the latter case, the fluidized layer produces already a further conversion towards melamine.

The use of inert materials in the fluidized bed which serve only as heat transfer agents and are more resistant to abrasion and generally also cheaper than the catalysts suitable for the conversion of urea to melamine at normal pressure, has the advantage to limit the use of such expensive catalysts to the stationary layer. As a result, substantially no catalyst is lost and the cost of operation are not increased by such losses. In addition, it is no longer necessary to provide a filter or dust separator between the fluidizer bed vaporizer and the stationary bed catalyst.

In addition to the recited advantages, an inert fluidized layer avoids the poisoning of said layer, when consisting of a catalyst, by melamine or other difficultly vaporized intermediary products which generally do not evaporate without residue, such as biuret, ammelide, and ammeline. In contact with an inert layer only readily volatilized ammonium cyanate is formed.

As the evaporation of urea to ammonium cyanate is a strongly endothermic reaction, a fluidized bed with a high heat transfer factor is a suitable apparatus for said step; on the other hand, the reaction of ammonium cyanate vapor to melamine is weakly exothermic and, therefore, its heat balance is readily controlled in a stationary catalyst bed. For said bed, any reactor is suitable which permits to carry off the heat developed at the catalyst by the conversion of ammonium cyanate vapor or cyanuric acid vapor to melamine. Therefore, any reactor can be used whose catalyst space is constructed as a heat exchanger. Such reactors are, for instance, tubular reactors where the catalyst is disposed in the tubes; catalyst charges with embedded cooling coils; support of the catalyst on a plurality of superposed trays whereby said trays constitute heat exchange faces.

The temperature of the stationary catalyst layer is maintained between 260 and 450° C., preferably between 320 and 400° C.

The amount of catalyst employed is such that the weight ratio of catalyst to urea per hour is greater than 1, preferably greater than 5. The amount of ammonia required for the process (for operation of the fluidized bed, as possible reactant, and for sublimation of the melamine formed on the catalyst) depends on the urea charge; the weight ratio of ammonia to urea at the entrance to the stationary catalyst bed must be higher than 1, preferably in excess of 1.5.

In order to obtain melamine yields of 96% according to the process of the invention, catalysts must be employed which contain phosphate, borate, arsenate, or sulfate, whereby the balance of the catalyst consists entirely or essenially of aluminum oxide in free or chemically bound form. Hereby, it is of no importance in which manner said ions are introduced into the catalyst, as free acid, as salt, as organic derivative, or as a thermal conversion product of such compounds. Also the manner of introducing such ions into the alumine gel does not affect the catalytic efficiency of the gel. The gel may be impregnated with solution of the free acids or of the salts, or the acids, their salts or organic derivatives may be added to the aluminum salt solution from which the alumina gel is precipitated in known manner. Instead of the acids, also their anhydrides may be used.

The phosphate may be applied as ortho-, pyro-, or metaphosphate, or in the form of organic phosphates; thereby, the pyro or metal form may be produed from the ortho form on the catalyst itself by heating. Also aluminum phosphate gels of varying composition may be used.

The ratio by weight of phosphate to total catalyst may be between 0.01 to 35 percent, calculated as P. For the other catalyst additions, the respective ratios are:

| | Percent |
|---|---|
| B | 0.0035 to 13 |
| As | 0.02 to 45 |
| S | 0.01 to 28 |

Other suitable catalysts contain phosphoric acid, boric acid, arsenic acid, or sulfuric acid, or salts thereof on finely divided silica, titanium dioxide, zirconium dioxide, vanadium pentoxide, chromium oxide, iron oxide, or carbon, which support must not have an inner surface and must be so finely divided that their specific outer surface is at least 0.1 m.$^2$/g, preferably more than 20 m.$^2$/g. The terms "phosphoric acid" etc. are used to designate also compounds of such acids which are not volatile at reaction temperature or are converted to such compounds.

The ammonium cyanate vapor developed as an intermediate product is highly corrosive and, under the catalytic influence of metals or alloys, may enter into undesired side-reactions which decrease the yield. We have found that copper is an excellent construction material for the apparatus because it is neither corroded by ammonium cyanate nor does it catalyze the side reactions. It is, therefore, of advantage to make all parts of the apparatus of copper which comes in contact with ammonium cyanate, ammonia, and melamine. Those parts are essentially the container of the fluidized bed, the reactor, and the connecting pipes. Similarly good yields are obtained only in apparatus made of quartz ware which is not suitable for large scale operation.

The following comparative examples illustrate the invention. All parts are given by weight, unless indicated otherwise.

*Example 1*

The apparatus consists of an externally heated fluidized bed vaporizer connected by a pipe with a vertical reactor which can be cooled or heated from the outside. The reactor contains 900 parts of stationary catalyst. The vapors pass downwardly through the reactor and enter then into a melamine separator which is maintained by means of steam at a temperature of 200° C.

The entire apparatus is made of copper, except the melamine separator which consists of aluminum.

The fluidized bed is filled with sea sand of 0.1 to 0.3 mm. grain size. The catalyst is finely divided silica (diameter of the primary particles 20 mm.) activated by impregnation with 10% $H_3PO_4$. The temperature in the fluidized bed is 375° C, in the catalyst bed 340–360° C. 300 Nl/hour of ammonia preheated at 350° C. are blown into the fluidized bed vaporizer for spinning around the sea sand and serving as carrier gas. 150 parts of molten urea are fed into the thus produced fluidized bed. In this way, 10,800 parts of urea are reacted within 72 hours. Within this period of time, 3,647 parts of sublimate, containing 99.5% of melamine, are recovered in the melamine separator. This corresponds to a yield of 96%, calculated on urea.

The following examples show the results of comparative runs obtained under conditions not corresponding to the invention.

*Example 1a*

The preceding test was carried out with unimpregnated silica gel as catalyst. Within 65 hours, 9750 parts of urea produced 3074 parts of sublimate containing 97.9% of melamine. This corresponds to a melamine yield of 88.2%.

*Example 1b*

The test of Example 1 was repeated in apparatus made of other materials. The results are given in the following table.

TABLE

| Material | Melamine yield, percent | Melamine content of the sublimate, percent |
|---|---|---|
| Copper | 96.0 | 99.5 |
| V4A steel | 72.4 | 85.7 |
| Ordinary steel | 56.6 | 77.2 |
| Remanit HC | 40.4 | 61.8 |
| Rotosil (quartz ware) | 94.5 | 99.6 |

The table shows that only copper and quartz ware apparatus are suitable for carrying out the process of the invention for the conversion of urea to melamine at substantially atmospheric pressures. If desired slightly elevated pressures up to 10 atm. may, however, be used.

When in Example 1 copper granules were used instead of sea sand, under otherwise the same conditions, 3640 parts of sublimate containing 99.9% of melamine were obtained, corresponding to a yield of 96.2%, calculated on urea.

Other non-porous and non-adsorbing inert materials can also be used for the fluidized bed, if they are resistant to urea, cyanic acid and ammonia at reaction temperatures. Such materials are for instance basalt, porphyry, granite, barite, porcelain, titanium, tantalum, silver.

We claim:

1. In the process for the continuous preparation of melamine which comprises heating urea under substantially atmospheric pressure in a current of ammonia in a fluidized bed of a non-adsorbing non-porous inert material to form ammonium cyanate and passing said ammonium cyanate vapor at a temperature of 260 to 450° C. over a stationary bed of a material containing as catalyst an ion of the group consisting of phosphate, borate, arsenate, and sulfate, the improvement which consists of conducting said process in a reaction zone which presents essentially surfaces of copper to the molten and gaseous phases therein.

2. The process as claimed in claim 1 wherein said fluidized bed is maintained at a temperature of 250 to 500° C.

3. The process as claimed in claim 1 wherein the inert material of the fluidized bed consists of copper granules.

4. The process as claimed in claim 1 wherein as catalyst the said ions are combined with alumina.

5. The process as claimed in claim 1 wherein as catalyst the said ions are combined with a finely divided substance substantially without inner surface and selected from the group consisting of silica, titanium dioxide, zirconium oxide, vanadium pentoxide, chromium oxide, iron oxide, and carbon.

References Cited by the Examiner

UNITED STATES PATENTS

| | | | |
|---|---|---|---|
| 3,054,796 | 9/1962 | Fisher et al. | 260—249.7 |
| 3,903,644 | 6/1963 | Steggerda | 260—249.7 |
| 3,905,416 | 6/1963 | Crowley et al. | 260—249.7 |
| 3,112,312 | 11/1963 | Veltman et al. | 260—249.7 |
| 3,152,128 | 10/1964 | Steggerda | 260—249.7 |
| 3,163,648 | 12/1964 | Kaess et al. | 260—249.7 |

WALTER A. MODANCE, *Primary Examiner.*

NICHOLAS S. RIZZO, *Examiner.*

M. W. WESTERN, JOHN H. FORD,
*Assistant Examiners.*